US009197687B2

(12) United States Patent
Smith

(10) Patent No.: US 9,197,687 B2
(45) Date of Patent: Nov. 24, 2015

(54) PRIORITIZED BLOCKING OF ON-DEMAND REQUESTS

(71) Applicant: Verizon Patent and Licensing Inc., Basking Ridge, NJ (US)

(72) Inventor: Donald E. Smith, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 246 days.

(21) Appl. No.: 14/056,033

(22) Filed: Oct. 17, 2013

(65) Prior Publication Data
US 2015/0113156 A1    Apr. 23, 2015

(51) Int. Cl.
*H04L 29/06* (2006.01)
*H04L 12/911* (2013.01)
*H04L 12/851* (2013.01)
*H04L 12/58* (2006.01)
*H04L 12/801* (2013.01)
*H04L 12/40* (2006.01)

(52) U.S. Cl.
CPC ........... *H04L 65/60* (2013.01); *H04L 12/40143* (2013.01); *H04L 47/10* (2013.01); *H04L 47/24* (2013.01); *H04L 47/823* (2013.01); *H04L 51/26* (2013.01)

(58) Field of Classification Search
CPC .............. H04L 12/40143; H04L 47/24; H04L 47/2466; H04L 51/26; H04L 41/147; H04L 47/823; H04L 65/4084; H04L 65/60; H04L 47/10; H04L 47/2458; H04L 47/2408; H04L 47/14; H04L 47/12
See application file for complete search history.

(56) References Cited

U.S. PATENT DOCUMENTS

| 7,788,357 B2 * | 8/2010 | Riley et al. | 709/223 |
| 2008/0222640 A1 * | 9/2008 | Daly et al. | 718/103 |
| 2010/0226252 A1 * | 9/2010 | Gogic et al. | 370/236 |

* cited by examiner

*Primary Examiner* — Chirag R Patel

(57) ABSTRACT

A method, a device, and a non-transitory storage medium having instructions to receive a request for a program from a user device; identify a type of the request, wherein the type of the request pertains to a prioritized blocking service that affords a prioritized access to the at least one of the downloading service or the streaming service, on behalf of at least one type of request over at least one of another type of request; determine whether the prioritized blocking service is to be invoked based on an identification of the type of request; use prediction data that indicates a future arrival time and a future completion time of a request having a higher priority relative to the identified request; calculate an available bandwidth based on the use of the prediction data; and block the identified request when the available bandwidth cannot support a session for the identified request.

21 Claims, 12 Drawing Sheets

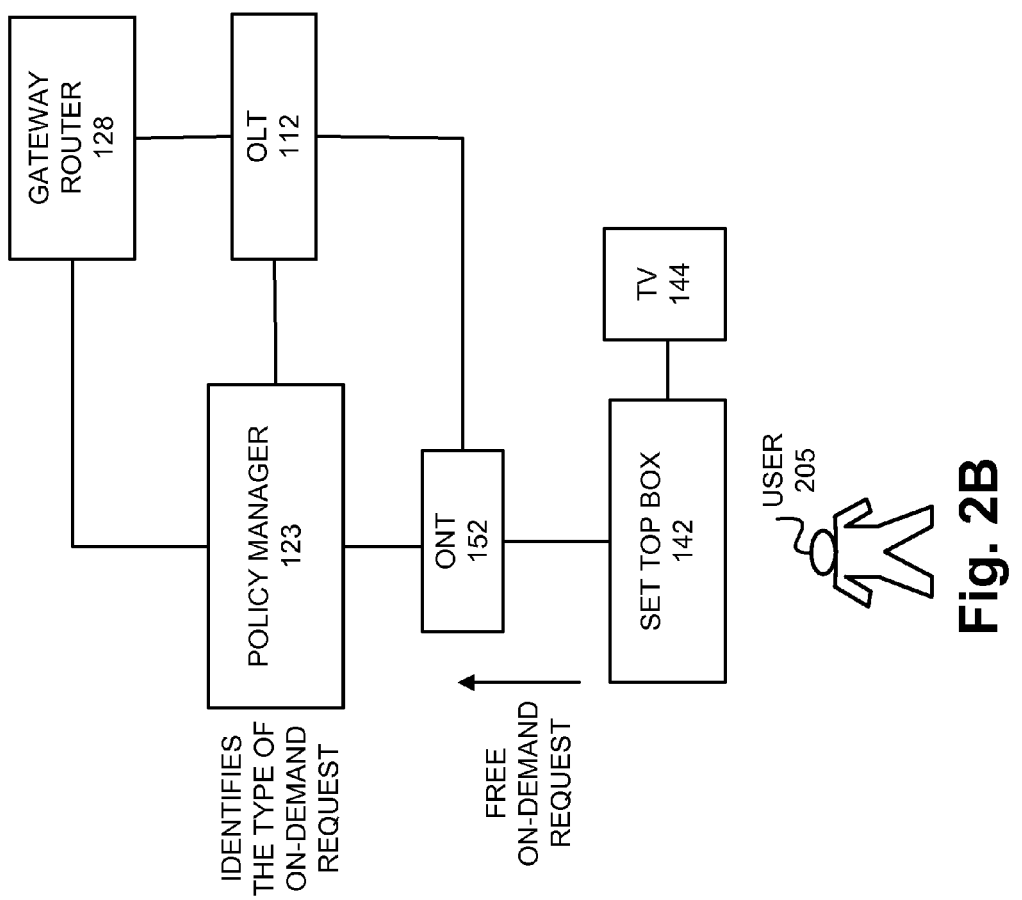

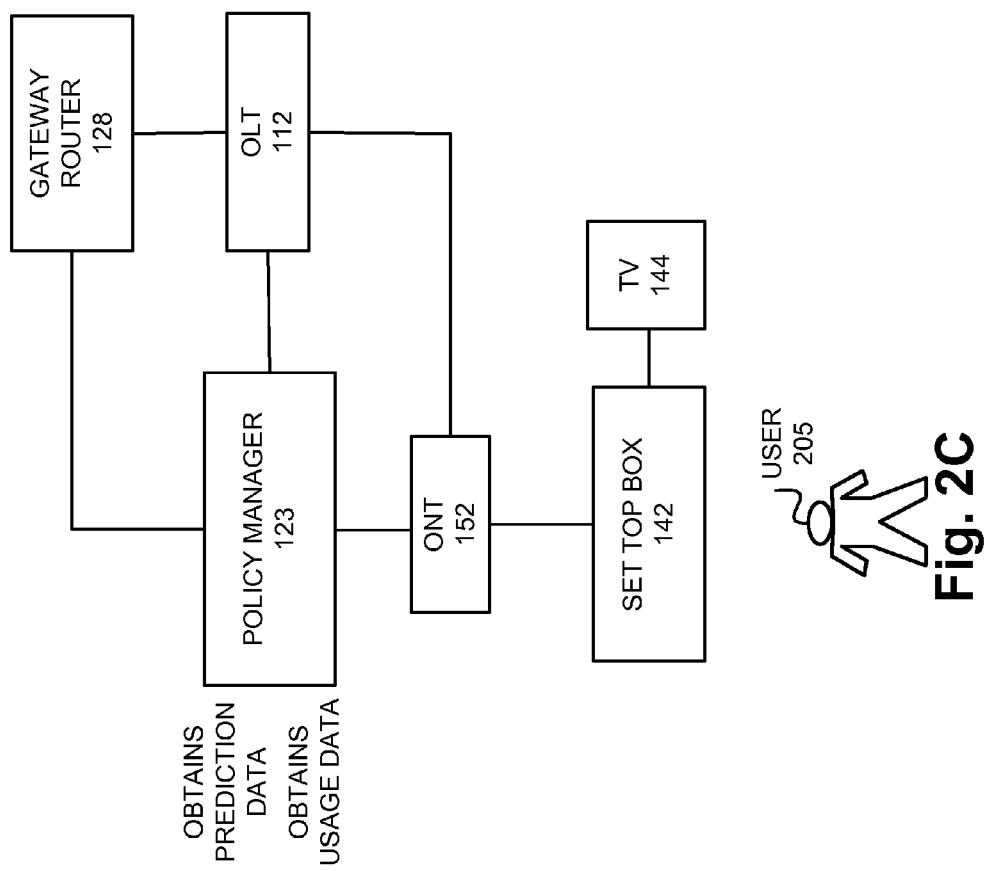

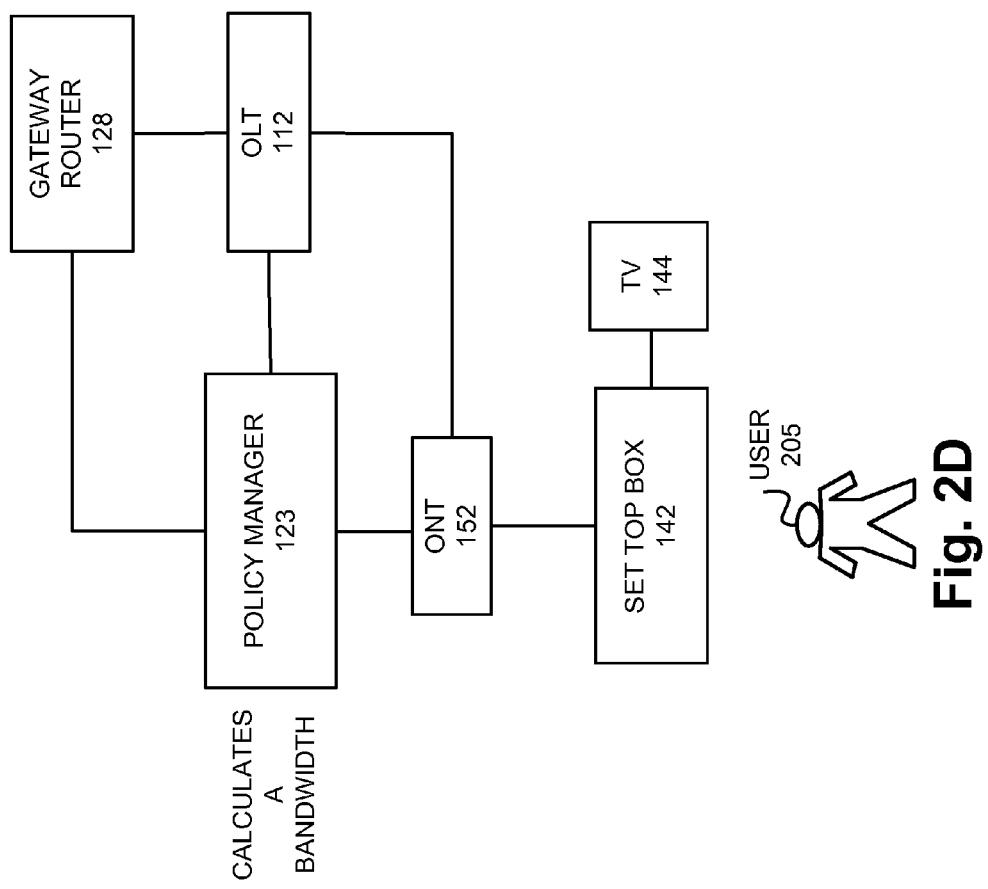

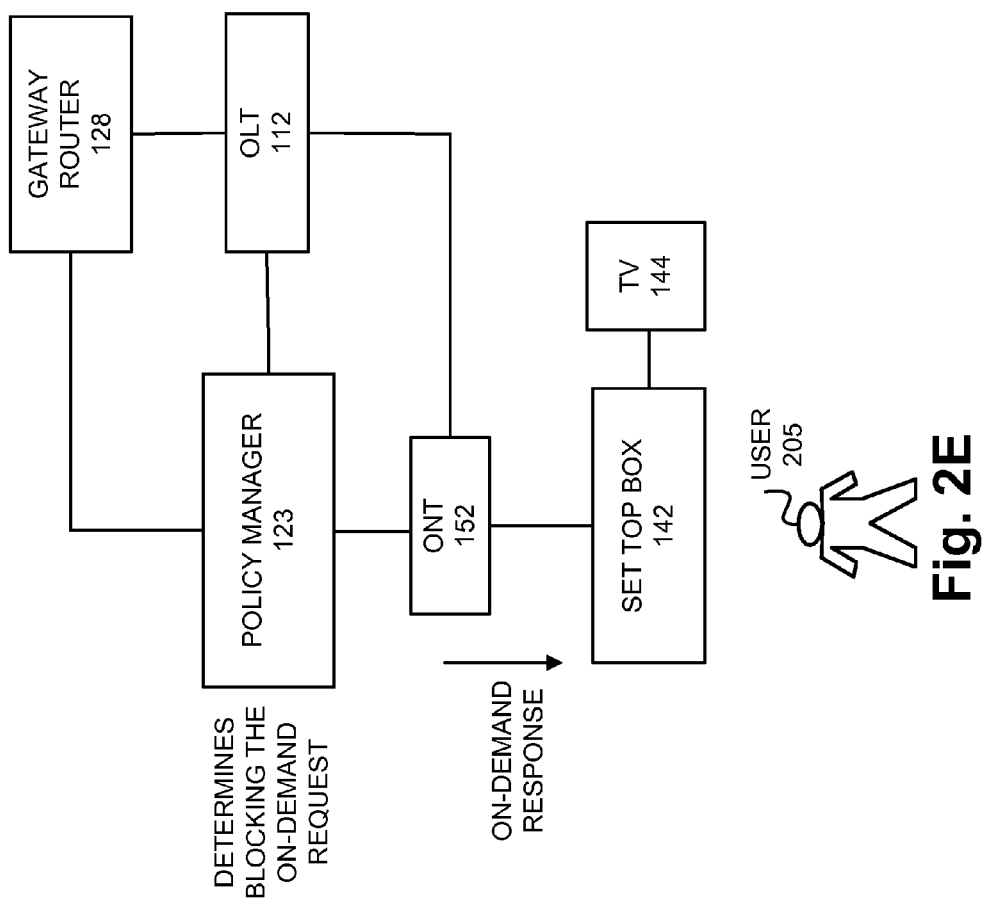

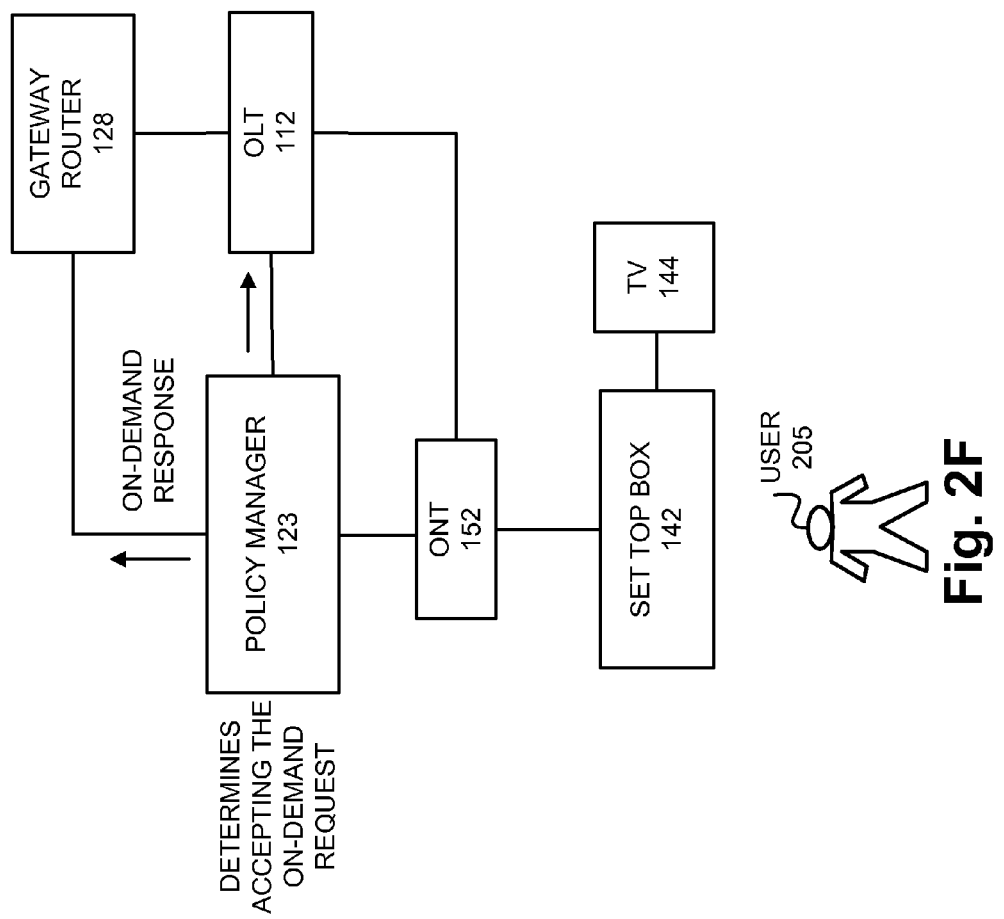

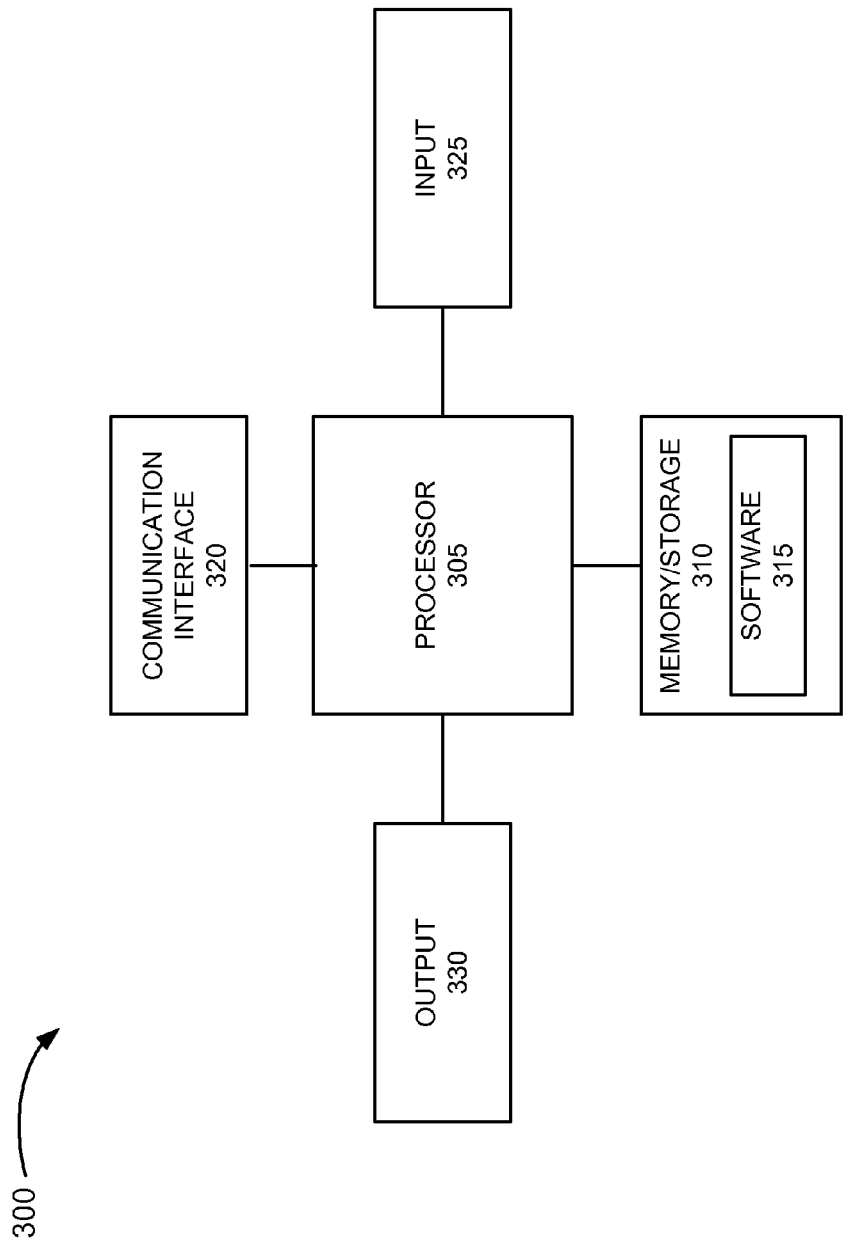

US 9,197,687 B2

PRIORITIZED BLOCKING OF ON-DEMAND REQUESTS

BACKGROUND

Streaming and downloading of programs are popular delivery methods for providing the programs to users. A content delivery network (CDN) (also known as a content distribution network) is typically used for streaming and/or downloading the programs. The content delivery network stores the programs and services requests for the programs.

BRIEF DESCRIPTION OF THE DRAWINGS

FIGS. 2B-2F are diagrams that illustrate an exemplary process pertaining to the prioritized blocking of on-demand requests;

FIG. 3 is a diagram illustrating exemplary components of a device that may correspond to one or more of the devices in the exemplary environment.

DETAILED DESCRIPTION OF PREFERRED EMBODIMENTS

Figure 1A:
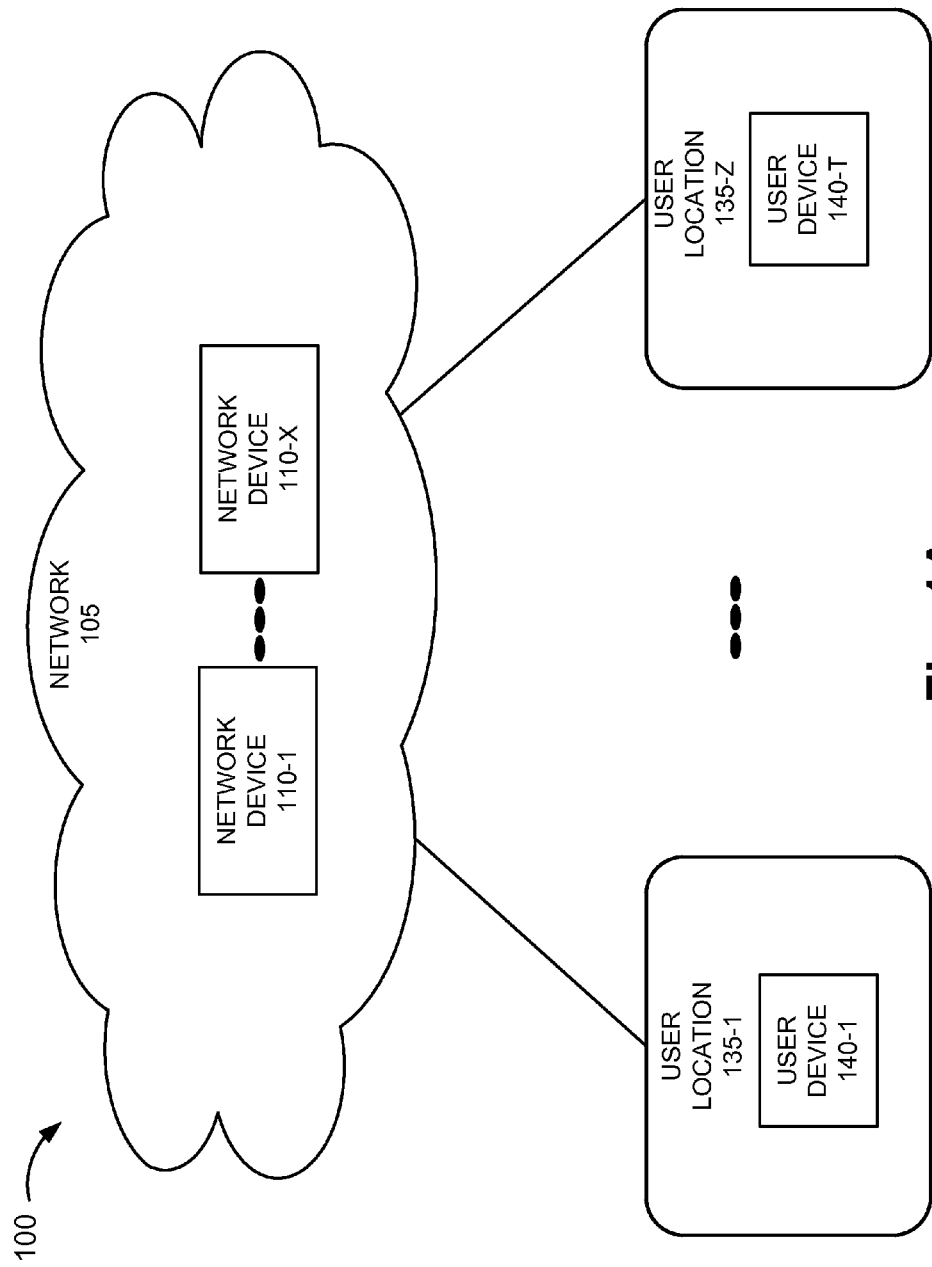
FIG. 1A is a diagram illustrating an exemplary environment in which exemplary embodiments may be implemented.

The following detailed description refers to the accompanying drawings. The same reference numbers in different drawings may identify the same or similar elements. Also, the following detailed description does not limit the invention.

A television service provider or another type of service provider (e.g., a mobile service provider, an Internet service provider) may offer an on-demand service for programs. The service provider allocates network resources to service on-demand requests. When the network resources are being fully utilized, on-demand requests are turned away. For example, when the service provider network receives an on-demand request at a time when no more network capacity is available, a user may receive a message telling the user to try again later.

The on-demand service may offer various types of programs, such as free programs and paid programs (e.g., buy, rent, etc.). In this regard, the service provider network may receive different types of on-demand requests, such as an on-demand request for a free program and an on-demand request for a paid program. However, when there is no more network capacity available, the service provider network does not discriminate between refusing the on-demand request for a free program and refusing the on-demand request for a paid program.

One approach to address this issue is to allocate network resources for each type of on-demand request. For example, assume that a node of the network allocates 800 megabits/second (Mbps) for its on-demand service in which 600 Mbps is allocated for free on-demand and 200 Mbps for paid on-demand. However, if the paid on-demand load is at 100 Mbps and there are on-demand requests that exceed the 600 Mbps limit, free on-demand requests will be blocked.

Another approach to address this issue is to give paid on-demand requests preemptive priority over free on-demand requests. For example, when there is not enough bandwidth and a paid on-demand request is received, the network terminates free on-demand sessions to obtain a sufficient amount of available bandwidth so as to service the paid on-demand request. However, this approach has the ill-effect of disrupting the on-demand service of a user that has already begun an on-demand session.

According to an exemplary embodiment, the servicing of on-demand requests are managed based on priorities assigned to different types of on-demand requests and a predictive reservation of network resources (e.g., bandwidth). According to an exemplary embodiment, bandwidth is dynamically reserved over time based on predictions of arrival times of on-demand requests. For example, assume that the different types of on-demand requests include free on-demand requests and paid on-demand requests, according to an exemplary embodiment, free on-demand requests are blocked at the time the free on-demand requests are received. The free on-demand requests are blocked based on the predictions of arrivals of the paid on-demand requests. In this way, network resources are reserved and can be allocated to service paid on-demand requests. In other words, this exemplary embodiment may be a method that identifies an on-demand request as a high priority request or a low priority request; if identified as the high priority request, the method immediately services the high priority request provided that sufficient total bandwidth is available to continue servicing previous requests that were being serviced at the time of arrival of the high priority request; and if identified as the low priority request, the method predicts if future high priority requests shall be made over the duration of the low priority request and, if so, the method allows the low priority request if sufficient total bandwidth is available to both continue servicing previous requests being serviced at the time of arrival of the low priority request and service all of the future high priority requests and, if not, the method disallows the low priority request.

According to an exemplary embodiment, a policy manager governs the handling of on-demand requests based on levels of priorities associated with different types of on-demand requests for programs. According to an exemplary embodiment, the policy manager predicts the arrivals of on-demand requests having a higher priority relative to other types of on-demand requests. The policy manager uses prediction data to determine whether to reject or accept on-demand requests having a lower priority at the time the lower priority on-demand requests are initially received. According to an exemplary embodiment, the policy manager also considers the amount of available bandwidth allocated for the on-demand service. For example, according to an exemplary embodiment, the policy manager calculates the amount of bandwidth to be used if the predicted on-demand requests are received, if the current on-demand sessions continue over their projected lifetime, and if the on-demand request having the lower priority is also serviced. Based on this calculation, the policy manager determines whether to accept or block the on-demand request having the lower priority. The policy manager is described further below.

FIG. 1A is a diagram illustrating an exemplary environment 100 in which exemplary embodiments may be implemented. As illustrated, environment 100 includes a network 105. Network 105 includes network devices 110-1 through 110-X, in which X>1 (also referred to collectively as network devices 110 or individually as network device 110). Environment 100 also includes user locations 135-1 through 135-Z, in which Z>1 (also referred to collectively as user locations 135 or individually as user location 135). Each user location 135 includes a user device 140, illustrated as user devices 140-1 through 160-T, in which T>1 (also referred to collectively as user devices 140 or individually as user device 140).

Environment 100 may be implemented to include wired, optical, and/or wireless connections among the devices and the network illustrated. A connection may be direct or indirect and may involve an intermediary device and/or an intermediary network not illustrated in FIG. 1A. Additionally, the number and the arrangement of connections between the devices and the network of environment 100 are exemplary.

The number of devices and networks, and the configuration in environment 100 are exemplary. According to other embodiments, environment 100 may include additional devices, fewer devices, different devices, and/or differently arranged devices, than those illustrated in FIG. 1A. For example, a single device in FIG. 1A may be implemented as multiple devices and/or multiple devices may be implemented as a single device. By way of further example, user location 135 may include multiple user devices 140. Additionally, or alternatively, environment 100 may include an additional network and/or a differently arranged network, than that illustrated in FIG. 1A.

A device may be implemented according to a centralized computing architecture, a distributed computing architecture, or a cloud computing architecture. Additionally, a device may be implemented according to one or multiple network architectures (e.g., a client device, a server device, a peer device, a proxy device, and/or a cloud device).

According to other embodiments, environment 100 may include additional networks and/or different networks than those illustrated and/or described in reference to FIG. 1A. For example, environment 100 may include other types of network(s), such as the Internet, etc. Also, according to other embodiments, one or more functions and/or processes described as being performed by a particular device may be performed by a different device, or some combination of devices.

Network 105 includes a network that provides an on-demand service to users. For example, network 105 includes a program repository that stores programs and a program delivery network to service on-demand requests. Network 105 may be implemented as a satellite-based network, a terrestrial-based network, or a combination thereof. According to an exemplary implementation, network 105 provides programs to users that subscribe to a television service. Additionally, or alternatively, network 105 may provide programs to users that subscribe to other types of services, such as a mobile service or an Internet service. Network 105 may be implemented as a television distribution network, a mobile network, a program streaming network, a program downloading network, or other suitable network (e.g., the Internet, a vehicular communication network, etc.) for providing programs to users within an on-demand service.

Network devices 110 include network devices that are capable of performing processes, as described herein. For example, a portion of network devices 110 is capable of delivering programs to users via user devices 140 of user locations 135. For example, this portion of network devices 110 may be implemented to deliver programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, this portion of network devices 110 may include various types of program distribution devices, program storage devices, and other types of devices that contribute to the on-demand program service, such as, billing devices, security devices, customer profile devices, and application server devices. By way of further example, this portion of network devices 110 may include super headend (SHE) devices, video hub office (VHO) devices, video serving office (VSO) devices, routers, gateway devices, program server devices, interactive programming guide devices, load balancer devices, optical network termination (ONT) devices, switching devices, splitter devices, passive optical network (PON) devices, web servers, etc.

A portion of network devices 110 is capable of acquiring historical request data. For example, the historical request data includes timestamp data (e.g., date, day, hour, minute, second) pertaining to the arrival of on-demand requests. The historical request data includes data indicating the type of on-demand requests received. Depending on the implementation, there may be two or more types of on-demand requests. For example, one type of on-demand request may be an on-demand request for a free program (i.e., a free on-demand request) and another on-demand request may be for a paid program (i.e., a paid on-demand request). The historical request data may include other types of data that indicate such things as the duration of the on-demand sessions, the type of delivery (e.g., streaming, downloading), the bandwidth used, etc. By way of example, this portion of network devices 110 may be implemented as a database management system or other form of repository system.

A portion of network devices 110 is capable of managing the servicing of on-demand requests. As described herein, this portion of network devices 110 predicts the arrival of on-demand requests based on the historical request data. Additionally, as described herein, this portion of network devices 110 makes determinations relating to the servicing of on-demand requests based on the prediction of arrivals of on-demand requests, the types of on-demand requests, and the usage of network resources. This portion of network devices 110 determines when prioritized blocking of on-demand requests occurs. By way of example, this portion of network devices 110 may be implemented to include an analytics system.

User location 135 is a location of a user. For example, user location 135 may be a residence, a place of business, or other location in which the user is located. User device 140 includes a device that interfaces with network 105 and/or provides a program to the user for digestion. For example, user device 140 may include a display device (e.g., a television, a smart television, a monitor), a set top box (e.g., a client device, a thin client device, a converter box, a receiver, a tuner, a digibox, an Internet Protocol Television (IPTV) set top box), a server device (e.g., a media server that includes tuners) that services one or multiple set top boxes, a mobile device (e.g., a smartphone, a tablet device, etc.), a vehicular communication system, an optical network termination device, a router, a modem, a computer (e.g., a desktop computer, a laptop computer, a netbook, a palmtop computer, etc.), an audio device (e.g., speaker, audio receiver, etc.), or other type of end user device (e.g., an Internet access device, etc.). In some cases, user devices 140 form a local area network (LAN).

Figure 1B:
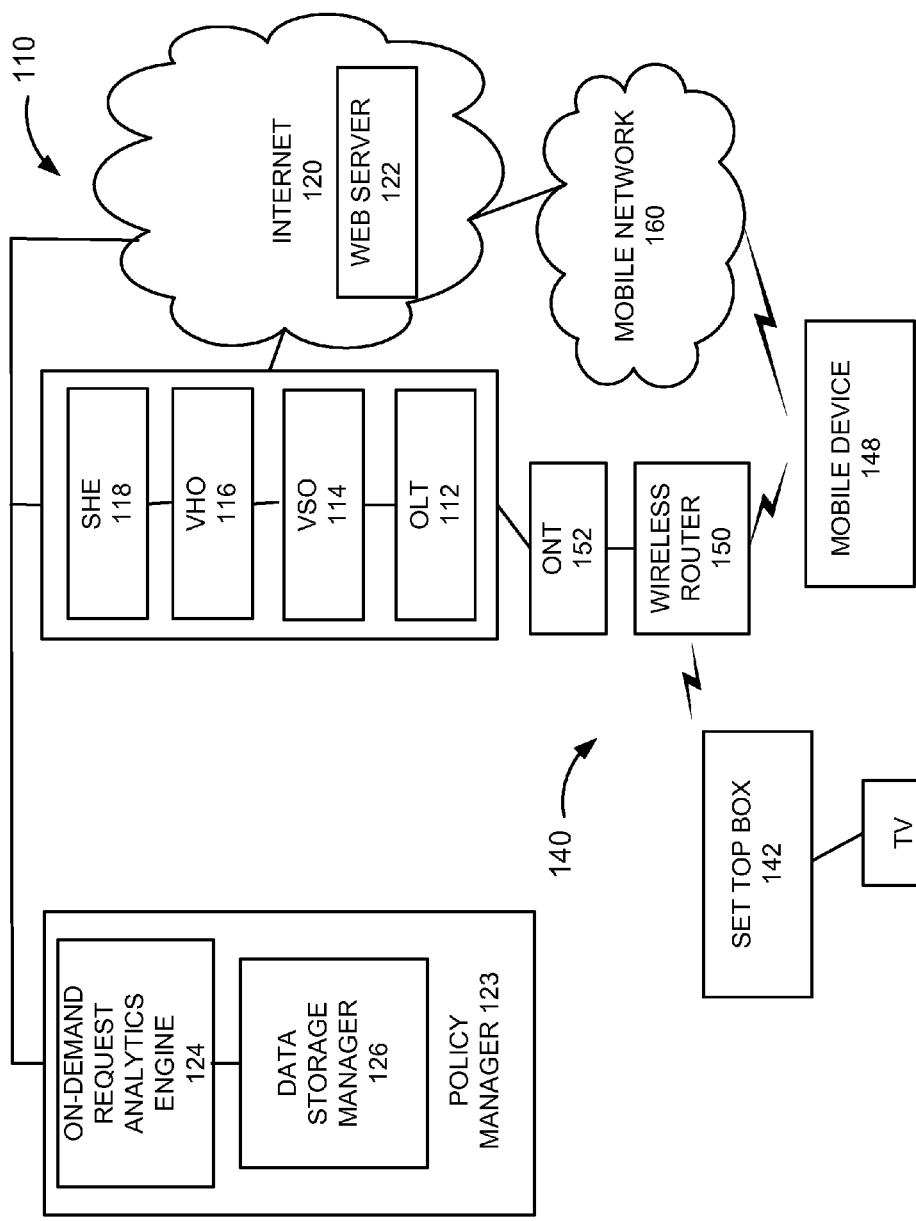
FIG. 1B is a diagram illustrating exemplary network elements and exemplary end user elements of the exemplary environment depicted in FIG. 1A.

FIG. 1B is a diagram illustrating exemplary network elements of network devices 110 and exemplary end user elements of user devices 140. For example, a portion of network devices 110 is capable of delivering programs to users via user devices 140. For purposes of description, assume that a program delivery network is implemented to include an optical network. According to such an implementation, network devices 110 include an optical line termination (OLT) 112, a video serving office (VSO) 114, a video headend office (VHO) 116, and a super headend (SHE) 118. By way of example, OLT 112 serves as the program service provider's endpoint. OLT 112 may provide downstream and upstream frame processing, etc. VSO 114 distributes programs to user locations 135 via access networks. VHO 116 includes network elements that ingest programs on a regional level and a local level. VHO 116 may also provide on-demand services, etc. SHE 118 includes network elements that ingest programs on a national level. SHE 117 may aggregate, process, encode, and distribute programs to VHO 116.

VHO 116, VSO 114, and/or SHE 118 also include storage devices that store user interfaces (e.g., interactive programming guides (IPGs), main menu, sub-menus, etc.) and programs pertaining to the program service. Network devices 110 may also include network elements not specifically illustrated, such as switches, amplifiers, add/drop multiplexers, other types of intermediary network elements, etc. For example, VSO 114 may include gateway routers (GWRs), etc.

Network elements of the program delivery network may also include a web server 122. For example, web server 122 may provide IPTV, downloading, and/or streaming of programs to users. Web server 122 may reside in Internet 120.

As previously described, according to an exemplary embodiment, an on-demand program service manages on-demand requests based on a priority assigned to different types of on-demand requests. The on-demand program service dynamically reserves bandwidth over time based on the prediction of arrival times of certain type(s) of on-demand requests and the blocking of other type(s) on-demand requests having a lower priority relative to the certain type(s) of on-demand requests. As illustrated, a portion of network devices 110 that provide this service may include the following exemplary network elements, such as an on-demand request analytics engine 124 and a data storage manager 126. For purposes of description, analytics engine 124 and data storage manager 126 may also be referred to as a policy manager 123.

On-demand request analytics engine 124 calculates predictions for the arrivals of on-demand requests. For example, analytics engine 124 uses historical request data stored by data storage manager 126 to predict the arrival of a particular type of on-demand request. Analytics engine 124 may use various models, such as for example, goodness of fit (e.g., root mean-square error, average percent error, etc.), time series models (e.g., auto-regressive, moving average, auto-regressive moving average, auto-regressive integrated moving average, etc.), and/or other well-known methods. Analytics engine 124 may consider a variety of variables, such as for example, the day of the week, the time of day, the geographic area in which the on-demand service provides programs, pricing of programs available, popularity indexes associated with programs, density of subscription types in a geographic area (e.g., number of users with premium channel subscriptions that provides on-demand service for free on-demand programming, etc.), types of delivery (e.g., streaming, downloading), etc. While the complexities in which analytics engine 124 predicts arrivals expand beyond the scope of this description, analytics engine 124 may be configured to forecast the arrival of one or multiple types of on-demand requests. Additionally, analytics engine 124 may predict parameters, in addition to arrival times, that pertain to the on-demand requests, such as durations of the sessions based on length of programs and streaming delivery (e.g., 30 minutes, 60 minutes, 120 minutes, etc.), durations of the sessions based on size of program (e.g., in terms of bytes) and download delivery (e.g., 10 minutes, 15 minutes, etc.), bandwidth usage based on program characteristics (e.g., high-definition, standard definition, 3-D, etc.), etc.

Data storage manager 126 stores various types of data so as to provide the prioritized blocking of on-demand requests and resource reservation. For example, data storage manager 126 stores historical request data. As previously described, the historical request data may include data indicating timestamp data pertaining to on-demand requests, the types of on-demand requests received, the duration of the on-demand sessions, the delivery type of the programs, and other parameters pertaining to the on-demand request, the on-demand session, the users from which the on-demand requests originate, etc.

Data storage manager 126 stores usage data. For example, the usage data includes session data pertaining to active sessions between network devices 110 and user devices 140. According to an exemplary implementation, data storage manager 126 obtains session data from OLT 112. Additionally, or alternatively, policy manager 123 maintains a socket pool. The socket pool may indicate the states of socket connections (e.g., active, inactive, etc.) of OLT 112 or other network elements (e.g., a gateway router, etc.). Alternatively, other network elements may provide session data to data storage manager 126.

Data storage manager 126 may store other types of usage data. For example, the usage data may include network resource utilization data from OLT 112 or another network device (e.g., a network performance or monitoring device, a gateway router, etc.) (not illustrated). For example, the network resource utilization data may indicate available bandwidth, failure data (e.g., a device failure, a link failure, a power failure, etc.), or other types of network state data (e.g., data pertaining to network performance metrics, such as latency, etc.).

Data storage manager 126 may also store business rules pertaining to the on-demand service. For example, a business rule may indicate a minimum time period for collecting historical data before calculating predictions of arrivals for a type of on-demand request. Additionally, for example, a business rule may indicate a certain amount of bandwidth that is reserved for each type of on-demand request. While these business rules are exemplary, a service provider that implements the prioritized blocking and reservation service may formulate a variety of business rules that align with various policies and procedures of the service provider.

Data storage manager 126 may include a database management system (DBMS) that supports, among other things, a data model and a query language, and controls data access, data integrity, etc., relative to a database. According to an exemplary implementation, the database may be implemented as a relational database model. Data of the database may be stored in various types of data structures (e.g., files, records, objects, tables, etc.). The database may also store metadata. Data storage manager 126 may obtain the various types of data from various devices (e.g., user devices 140, network devices 110) and personnel (e.g., network administrators, users, etc.).

Additionally, the program delivery network may also include network elements of a mobile network 160. For example, although not illustrated, the network elements may include enhanced Node Bs (eNBs), serving gateways (SGWs), etc., of a Long Term Evolution (LTE) network.

Additionally, or alternatively, mobile network 160 may include network elements of another wireless communication standard.

Also illustrated in FIG. 1B are exemplary end user elements. For example, user device 140 may include a set top box 142 and a television (TV) 144. Set top box 154 may be implemented as a converter box, a television receiver, a tuner device, a digibox device, an Internet Protocol (IP) set top box, an IPTV set top box, and/or some other form of a set top box. According to other embodiments, for example, end user elements may include a mobile device 148. Mobile device 148 may be implemented as a smartphone, a tablet, a netbook, a computer, or other suitable mobile or portable communicative device.

Also illustrated in FIG. 1B are exemplary intermediary devices between user device 140 and network devices 110, such as a wireless router 150 and an optical network terminal (ONT) 152. Wireless router 150 may be implemented as an in-home router device, a broadband router, or a wireless router. Optical network terminal (ONT) 152 may be implemented as a conventional or a well-known ONT that interfaces with the optical network previously described.

The number of network elements, end user elements, and the configuration illustrated in FIG. 1B are exemplary. According to other embodiments, network devices 110 may include additional network elements, fewer network elements, different network elements, and/or differently arranged network elements, than those illustrated in FIG. 1B. For example, network devices 110 may include network elements that provide other types of services or functions, such as Internet service, telephone service, or alternatively merely access to one or more of these various services or functions. The connections illustrated in FIG. 1B are exemplary. Additionally, embodiments of the prioritized blocking of programs may support well-known techniques for the delivery of programs, such as single bit rate streaming/downloading and/or multi-bit rate streaming/downloading, smooth streaming, dynamic streaming, and/or adaptive bitrate streaming. Single bit rate streaming provides that the session runs at a constant bit rate for its lifetime. The rate may depend on the definition (e.g., standard, high, 3D) of the program. Under adaptive bit rate streaming, user device 140 (e.g., which includes a client) may request different bit rates during the viewing session. Network device 110 may support various protocols, such as, the Real Time Streaming Protocol (RTSP), the Real Time Messaging Protocol (RTMP), the Hypertext Transfer Protocol (HTTP) Live Streaming (HLS), the Microsoft Media Services (MMS) protocol, etc.

Figure 1C:
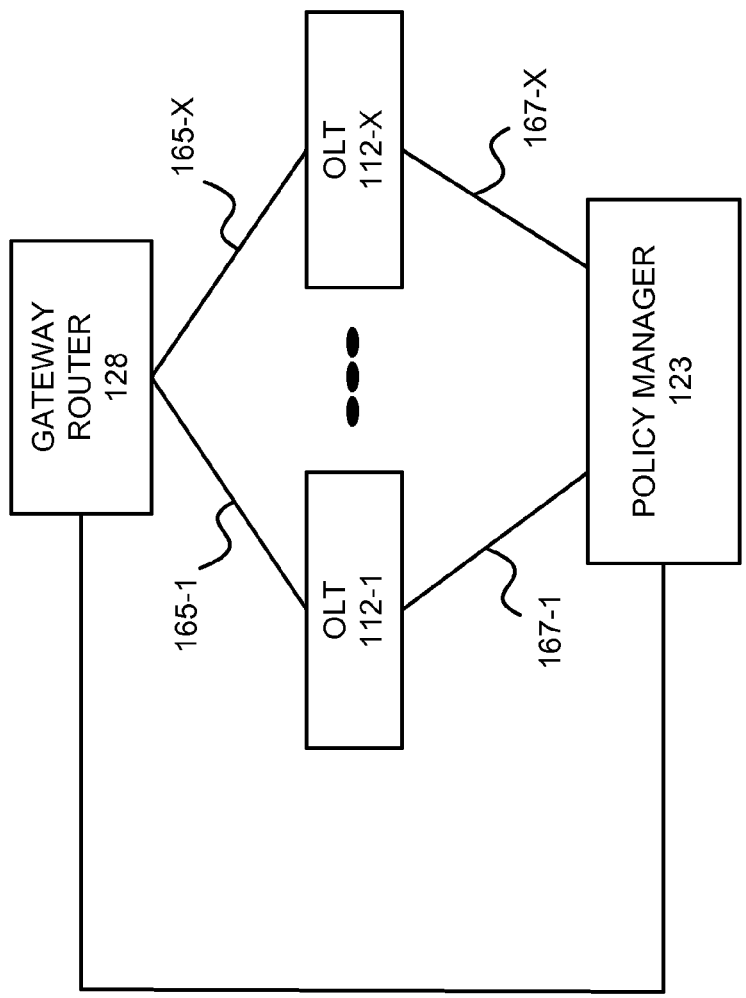
FIG. 1C is a diagram illustrating an exemplary configuration that includes a policy manager that performs an exemplary embodiment of prioritized blocking of on-demand requests.

While policy manager 123 may be implemented within various places in network 105 and may be communicatively coupled to various network elements, FIG. 1C is a diagram illustrating an exemplary configuration that includes policy manager 123. As described further below, policy manager 123 manages the handling of on-demand service requests for programs based on the prioritized blocking, as described herein. According to this exemplary configuration, policy manager 123 identifies bandwidth usage on links 165-1 through 165-X (also referred to as links 165 or individually as link 165). Policy manager 123 also governs the acceptance and denial of requests for programs that would be serviced by OLTs 112-1 through 112-X (also referred to as OLTs 112 and individually as OLT 112). For example, policy manager 123 may issue commands to gateway router 128 (e.g., which may be included in VSO 114), OLT 112, a video on-demand server (not illustrated), and/or some other network device 110 pertaining to the determination of blocking or not blocking requests and correspondingly providing or not providing the requested programs.

Figure 2A:
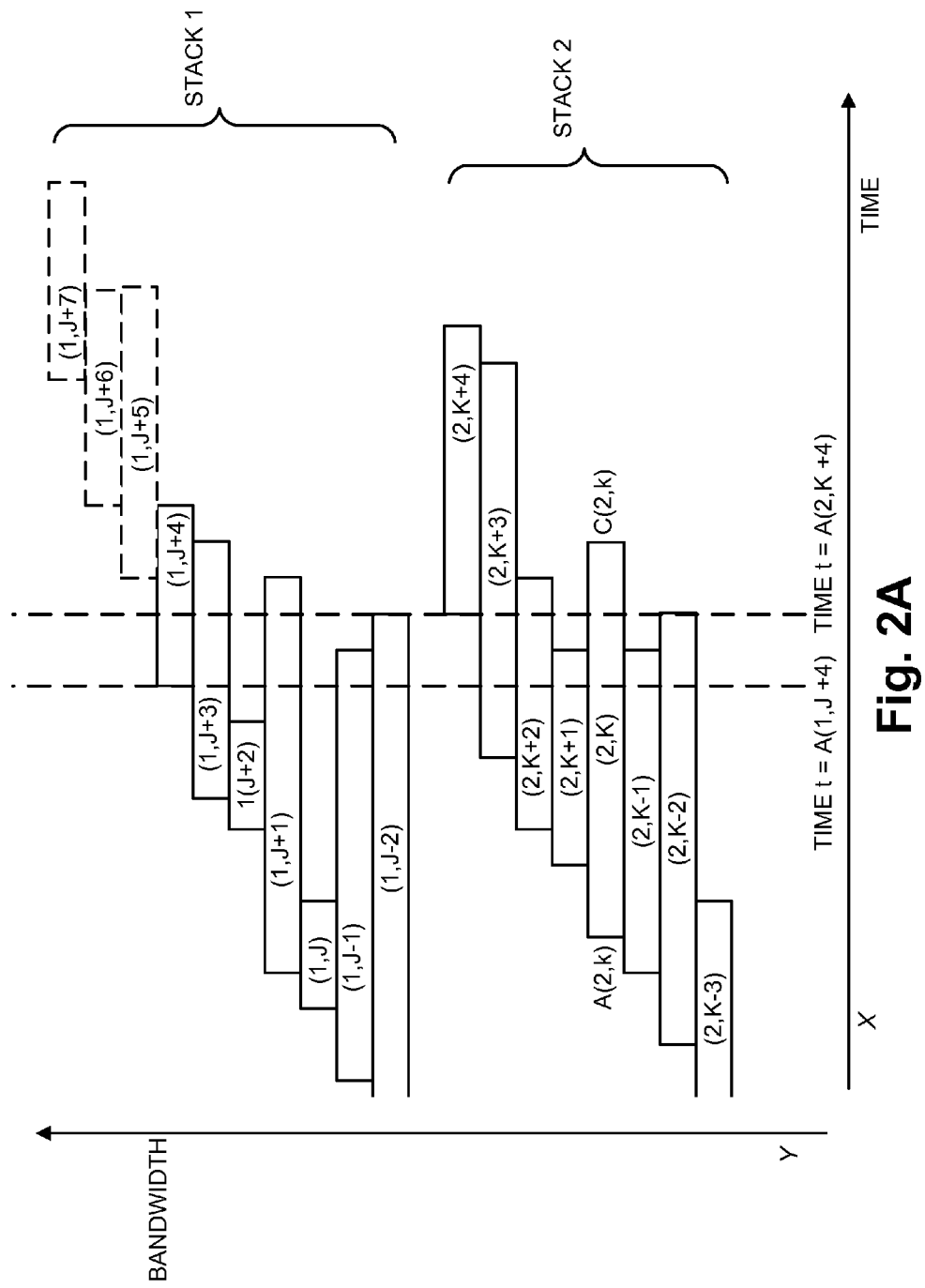
FIG. 2A is a diagram illustrating an exemplary representation of arrivals of on-demand requests and sessions.

FIG. 2A is a diagram that illustrates an exemplary representation of arrivals of on-demand requests and sessions. For example, the x axis represents time and the y axis represents the bandwidth required for each session. In FIG. 2A, each session is represented as a box whose left side occurs at the session request arrival time $A(i, j)$, in which i represents the type of session and j represents a session identifier (i.e., session $(i, j)$). Also, the right side of the box occurs at a session completion time $C(i, j)$, in which i represents the type of session and j represents the session identifier. Thus, the duration of the session is calculated as $C(i,j)-A(i,j)$. An example, of $A(i, j)$ and $C(i, j)$ is illustrated in relation to block $(2, K)$. For purposes of description, it may be assumed that $A(i,j)<A(i,k)$ if $j<k$. That is, session indices increase in order of request times. In FIG. 2A, it may be assumed that all the session use the same bandwidth (e.g., one unit of bandwidth).

In FIG. 2A, as illustrated, stack 1 represents on-demand requests or on-demand sessions of a type 1 and stack 2 represents on-demand requests or on-demand sessions of a type 2. According to this example, type 1 sessions have a higher priority than type 2 sessions. Also assume for purposes of this example, that a total amount of bandwidth allocated for type 1 and type 2 sessions is ten units of bandwidth. Referring to the vertical line at time $t=A(1, J+4)$, there is an arrival of an on-demand request (i.e., box $(1, J+4)$) in stack 1. At this moment, absent the receipt of the $(1, J+4)$ request, there are six type 1 sessions that are active. Also, in stack 2, there are four type 2 sessions that are active, which totals nine (9) units of bandwidth. According to this example, let $a=10$ units, which is the maximum amount of bandwidth allocated for all on-demand sessions.

Given the above state, there would be no bandwidth left to service the on-demand request (box $(1, J+4)$). Thus, the on-demand request would be blocked (e.g., by policy manager 123). On the other hand, if $a>10$ units of bandwidth, then the on-demand request (i.e., box $(1, J+4)$) would be accepted.

For type 2 arrivals, session acceptance depends on predicted future type 1 arrivals. For example, consider the arrival of an on-demand request (i.e., box $(2, K+4)$) in stack 2 at time $t=A(2, K+4)$. According to this case, policy manager 123 will accept this type 2 arrival only if the servicing of the type 2 request does not prevent a type 1 session from being accepted during the lifetime of the type 2 session. For example, as illustrated in stack 1, assume that policy manager 123 has predicted the arrival of three type 1 arrivals (illustrated as dash-line boxes $(1, J+5)$, $(1, J+6)$, and $(1, J+7)$). While additional type 1 session requests may be received prior to the arrival of one or more of these three type 1 arrivals, and subsequently cause policy manager 123 to block one or more these three type 1 arrivals, for purposes of description, assume that no additional type 1 session requests occur during this time window.

Referring to box $(2, K+4)$ in stack 2 and the duration of such a session over time t, which if accepted would overlap the start of each of the predicted on-demand sessions, policy manager 123 can calculate the available bandwidth and determine whether the on-demand request (i.e., box $(2, K+4)$) should be blocked or accepted based on the predicted arrivals and durations of type 1 sessions. For example, policy manager 123 may calculate bandwidth usage relative to the maximum allotted bandwidth at time $t=A(1, J+5)$, which is when the first type 1 session is predicted to arrive. As illustrated, sessions $(1, J+1)$ and $(2, K+2)$ have just ended and if session $(1, J+5)$ were accepted, the total bandwidth would be under ten units. At time t=A(1, J+6), when the second type 1 session is predicted to arrive, the total bandwidth would still be under nine (9) units. Additionally, at time t=A(1, J+7), when the third type 1 session is predicted to arrive, the bandwidth would still be under ten units. In view of these calculations, policy manager 123 may accept session (2, K+4). A description of exemplary expressions that may be used by policy manager 123 to determine whether to block or accept an on-demand request is provided below.

Let b(i, j) represent a bandwidth of session (i, j), as indicated in formulas (1), (2), and (3) below. The value of b depends on how the program is transmitted to the user. If the session uses single bit rate streaming, then b(i, j) is a fixed bandwidth. If the session uses adaptive bit rate streaming, then the bandwidth usage can change with time. For example, let b(i, j) (t) represent the bit rate that session (i, j) has requested at time t. Suppose that a type 1 session request (1, k) occurs at time A(1, k). The new session's b(1, k) at time A(1, k) is a function of the existing type 1 sessions at time A(1, k). By way of example, two possibilities for b may be 1) the average of the existing type 1 session bandwidths and 2) the minimum of the existing type 1 session bandwidths. Using the minimum provides for a more liberal acceptance policy for type 1 arrivals. For type 2 arrivals, for example, the average of existing type 2 bandwidths or the maximum may be used. The latter choice may increase the difficulty in accepting type 2 requests, thereby affording type 1 requests a higher priority.

In the case of program downloads, the session bandwidth b may be based on a rate limit the provider imposes to keep downloads from taking too much capacity from streaming services. The rate limit could be different for types 1 and 2. When a type 1 session request arrives, the bandwidth assigned to it for purposes of acceptance could be the rate limit or even a smaller value, analogous to using the minimum for type 1 adaptive bit rate sessions. When a type 2 request arrives, the assigned bandwidth could be the type 2 rate limit or a larger value, to lower its priority.

Also, let Y(i, j)=1 if session (i, j) is accepted and zero if it is blocked. According to an exemplary implementation, when a type 1 session request (1, k) is received, policy manager 123 determines whether to accept the type 1 session request based on the current bandwidth usage. To determine the value of Y(i, k), policy manager 123 calculates the bandwidth used by all the sessions in existence at time A(1, k) and determines whether there is headroom to add b(1, k) without exceeding the limit a, which is the maximum amount of bandwidth for all on-demand sessions.

In this case, Y(1, k)=1 if and only if:

$$\sum_{j<k} I(A(1, k) \leq C(1, j))Y(1, j)b(1, j) + \qquad(1)$$
$$\sum_{\{j:\ A(2,j)<A(1,k)\}} I(A(1, k) \leq C(2, j))Y(2, j)b(2, j) + b(1, k) \leq a.$$

In expression (1), the letter I represents an indicator function, which takes a value of 1 if its argument is a true statement and a value of 0 otherwise. The first sum of expression (1) adds up all for all preceding type 1 sessions that were accepted and are still running at time A(1, k). The second sum of expression (1) does the same for type 2 sessions. A summation of type 1 sessions, type 2 sessions, and the bandwidth of session (1, k) is compared to the value of a. The session will if the accepted if the entire sum is less than a.

As previously described, the complexity of type 2 arrivals stems from a prediction of type 1 arrivals during the type 2 session lifetime. In this case, let $S_1$ (2, k) represent the set of session numbers of predicted type 1 arrivals in the time interval [A(2, k), C(2, k)]. This may be a set of consecutive integers. For example, referring back to FIG. 2A, $S_1$ (2, k+4)= {j+5, j+6, j+7}.

For each j∈$S_1$ (2, k), policy manager 123 determines whether the predicted session (1, j) is accepted or blocked with an assumption that no further type 2 on-demand requests, including (2, k) are received.

In this case, Y(1, j)=1 if and only if:

$$\sum_{l<k} I(A(1, j) \leq C(2, l))Y(2, l)b(2, l) + \qquad(2)$$
$$\sum_{l<j} I(A(1, j) \leq C(1, l))Y(1, l)b(1, l) + b(1, j) \leq a.$$

Expression (2) allows policy manager 123 to determine {Y(1, j): j∈$S_1$ (2, k)}. However, Y (2, k)=1 if and only if there is enough bandwidth left over to handle b(2, k) after accommodating $S_1$ (2, k). That is, the condition is that the bandwidth used during the time period [A(2, k), C(2, k)] is at most a−b(2, k). Since the bandwidth is a step function, its local maxima occurs only at its points of increase, which are {A(1, j): j∈$S_1$ (2, k)}. Then, Y(2, k)=1, if and only if, for each j∈$S_1$(2, k), $$\sum_{l<k} I(A(1, j) \leq C(2, l))Y(2, l)b(2, l) + \qquad(3)$$
$$\sum_{l<j} I(A(1, j) \leq C(1, l))Y(1, l)b(1, l) + b(1, j)Y(1, j) + b(2, k) \leq a.$$

To predict the pattern of arrivals and corresponding session durations during a selected time interval, policy manager 123 may use several methods based on past history. For example, one approach would be to store records of previous arrivals for both type 1 and type 2 on-demand requests, as previously described in relation to data storage manager 126. By way of further example, assume records are stored for a particular time period (Saturdays between 8:00 p.m. through 9:00 p.m.). On-demand request analytics engine 124 can generate predictions of inter-arrival times and durations of on-demand type 1 and type 2 requests and sessions from these records pertaining to a future Saturday, 8:00 p.m. through 9:00 p.m. time period. According to another approach, policy manager 123 may fit a model to the data and generate random samples of inter-arrival times and session durations. Other well-known methods may be used to predict on-demand session requests and durations, as described herein.

When considering the prediction step, the variable A(1, j) can carry two meanings. For example, at a given time t, A(1, j) may denote a predicted arrival time if A(1, j)>t, and A(1, j) may denote an actual arrival time if A(1, j)≤t. As time t advances and the value of t becomes greater than a predicted arrival time, the predicted session may be deleted from future calculations. Similarly, when an actual type 1 arrival is received, this event may be inserted into a list (e.g., {A(1, j)}) according to an order of arrival. In both cases, later predicted arrivals may be renumbered, if necessary.

FIGS. 2B-2F are diagrams illustrating an exemplary process pertaining to prioritized blocking of on-demand requests. Assume that a user 205 wishes to view a free on-demand program and initiates an on-demand request via set top box 142. Set top box 142 generates the free on-demand request. The free on-demand request may include, for example, a program identifier, a type indicator that indicates the type of on-demand request (e.g., type 1, type 2, free, etc.), and a type of delivery indicator that indicates the type of delivery (e.g., stream, download). Set top box 142 transmits the free on-demand request towards ONT 152 and is routed to policy manager 123. Policy manager 123 receives the free on-demand request. Policy manager 123 identifies the type of on-demand request based on an inspection of the type indicator and the type of delivery based on an inspection of the delivery indicator.

Referring to FIG. 2C, policy manager 123 obtains prediction data stored in data storage manager 126. For example, the prediction data includes data pertaining to the future arrival of an on-demand request that has a higher priority (e.g., a paid on-demand request) than the free on-demand request. The prediction data may indicate the arrival time of the future on-demand request and other characteristics (e.g., length of the paid on-demand session, expected bandwidth usage, etc.). Additionally, policy manager 123 obtains usage data stored in data storage manager 126. For example, the usage data includes data pertaining to current, active on-demand sessions and network resource utilizations.

Referring to FIG. 2D, policy manager 123 calculates a bandwidth for comparison to the maximum bandwidth allocated for the on-demand service. For example, policy manager 123 calculates the bandwidth for comparison based on expressions (2) and (3), as previously described. Referring to FIG. 2E, assume, based on the above-mentioned calculations, policy manager 123 determines that the free on-demand request needs to be blocked in view of predicted arrivals of paid on-demand requests and available bandwidth. As illustrated in FIG. 2E, in response to this determination, policy manager 123 generates and transmits an on-demand response toward set top box 142. For example, the on-demand response may indicate that the on-demand service is unavailable and to try again at a later time. Alternatively, policy manager 123 may generate and transmit a program command to another network device (e.g., a video on-demand server, etc.) instructing the network device to inform user 205 that the on-demand service is unavailable. Referring to FIG. 2F, according to another scenario, assume, based on the above-mentioned calculations, policy manager 123 determines that the free on-demand requests is to be accepted in view of the predicted arrivals of paid on-demand requests and available bandwidth. As illustrated in FIG. 2F, in response to this determination, policy manager 123 generates and transmits an on-demand response to OLT 112, gateway router 128, and/or a video on-demand server (not illustrated). The on-demand response may indicate to service the on-demand request and provide the requested program to set top box 142.

While FIGS. 2B-2F illustrate an exemplary configuration and exemplary messaging, according to other implementations, a different configuration and/or different messaging may be used. For example, set top box 142 may communicate with a video on-demand server (not illustrated). Upon receiving an on-demand request, the video on-demand server may communicate with policy manager 123 to determine whether to accept or deny the on-demand request. Still further, other configurations and exemplary messaging may be implemented with an aim toward minimizing latency and resource utilization while maximizing efficiency, etc.

FIG. 3 is a diagram illustrating exemplary components of a device 300 that may correspond to one or more of the devices in the environments described herein. For example, device 300 may correspond to on-demand request analytics engine 124, data storage manager 126, user device 140, as well as other network devices. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to policy manager 123, software 315 may include an application that, when executed by processor 315, provides the functions of policy manager 123, as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or from another device (not shown) via communication interface 320. The instructions stored by memory/storage 310 may cause processor 305 to perform a process described herein. Alternatively, for example, according to other implementations, device 300 may perform a process described herein based on the execution of hardware (processor 305, etc.).

Figure 4A:
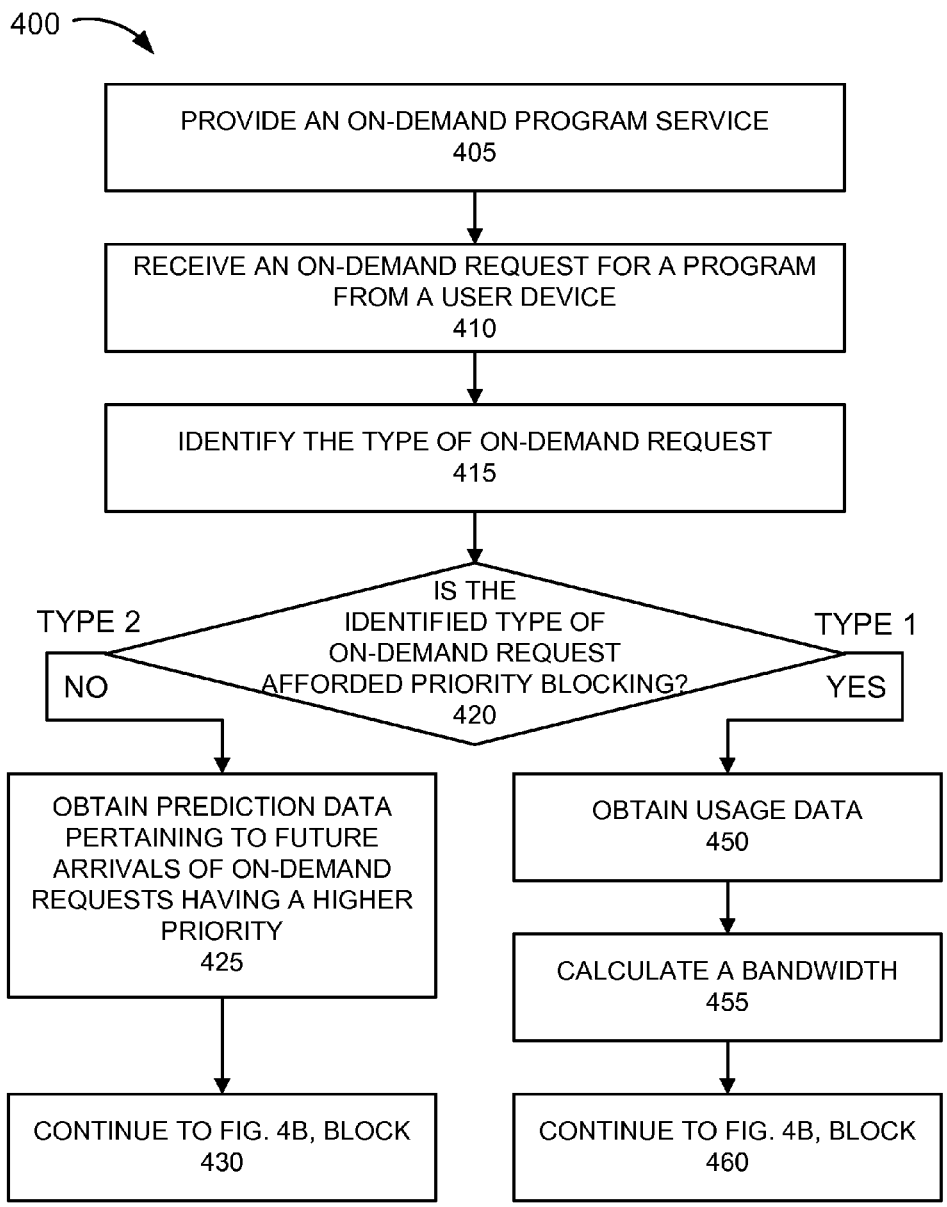
FIGS. 4A and 4B are flow diagrams that illustrate an exemplary process pertaining to the prioritized blocking of on-demand requests.
Figure 4B:
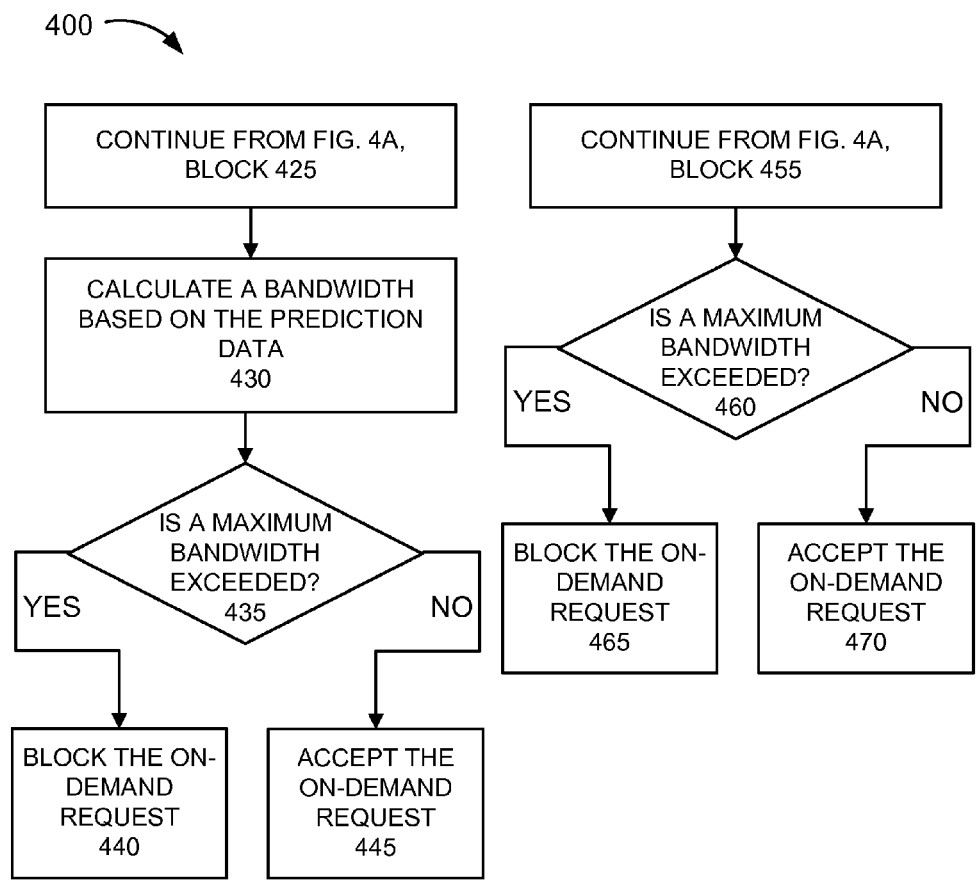

FIGS. 4A and 4B are flow diagrams illustrating an exemplary process 400 pertaining to the prioritized blocking of on-demand requests. Process 400 is directed to a process previously described above with respect to FIGS. 2B-2F and elsewhere in this description, in which policy manager 123 invokes prioritized blocking of on-demand requests. According to an exemplary embodiment, policy manager 123 performs one or more of the steps described in process 400. For example, processor 305 may execute software 315 to perform the steps described.

According to process 400, it may be assumed that an on-demand program service assigns different priorities to on-demand requests for programs. The number of different types of on-demand requests may be two or more. As an example, one type of on-demand request may be a request for purchasing a program and another type of on-demand request may be a request for free programming. According to another example, one type of on-demand request may be for buying a program, another type of on-demand request may be for renting a program, and yet another type of program may be for a free program. The on-demand service assigns a priority of service to each type of on-demand request in which an on-demand request of one type may have a higher priority than an on-demand request of another type, as previously described. For the sake of simplicity, process 400 is described in relation to a priority scheme in which there are only two types of on-demand requests, in which a type 1 on-demand request has a higher priority than a type 2 on-demand request.

Referring to FIG. 4A, process 400 begins by providing an on-demand program service (block 405). For example, network 105 offers on-demand programs to users via a downloading and/or streaming service. In block 410, an on-demand request for a program is received from a user device. For example, policy manager 123 receives an on-demand request for a program from user device 140.

In block 415, the type of on-demand request is identified. For example, policy manager 123 inspects the on-demand request. The on-demand request includes, for example, a type indicator that indicates a type of on-demand request. According to this example, the type indicator may indicate a type 1 on-demand request or a type 2 on-demand request. Policy manager 123 may inspect and identify other types of data included in the on-demand request, as previously described, such as, for example, the length of the program requested, the delivery type, the format of the program requested (e.g., high-definition, standard definition, etc.), etc.

In block 420, it is determined whether the identified type of on-demand request is afforded priority blocking. For example, as illustrated in FIG. 4A, a type 1 on-demand request is afforded priority blocking in that type 2 on-demand requests may be blocked on behalf of type 1 on-demand requests. Conversely, a type 2 on-demand request is not afforded priority blocking.

If it is determined that the on-demand request is not afforded priority blocking (block 420—YES), then prediction data is obtained (block 425). For example, policy manager 123 obtains prediction data pertaining to future arrivals of type 1 on-demand requests. As previously described, policy manager 123 may generate prediction data based on historical request data. Policy manager 123 may obtain other types of data, as previously described, such as usage data. For example, usage data may include session data and network resource utilization data.

Referring to FIG. 4B, a bandwidth is calculated based on the prediction data (block 430). For example, as previously described, policy manager 123 may calculate a bandwidth based on expressions (2) and (3).

In block 435, it is determined whether a maximum bandwidth is exceeded. For example, policy manager 123 determines whether the calculated bandwidth exceeds a maximum bandwidth. If it is determined that the maximum bandwidth is exceeded (block 435—YES), then the on-demand request is blocked (block 440). For example, policy manager 123 generates and transmits an on-demand response to user device 140. The on-demand response denies the request and access to the requested program. Policy manager 123 may communicate the denial to other network devices (e.g., OLT 112, gateway router 128, etc.).

If it is determined that the maximum bandwidth is not exceeded (block 435-NO), then the on-demand request is accepted (block 445). For example, policy manager 123 may generate and transmit an on-demand response to another network device (e.g., OLT 112, gateway router 128). The on-demand response may indicate to service the on-demand request. If not already received by the other network device, the on-demand response may include the on-demand request.

Referring back to FIG. 4A, if it is determined that the on-demand request is afforded priority blocking (block 420—YES), then usage data is obtained (block 450). For example, policy manager 123 obtains session data and network resource utilization data.

In block 455, a bandwidth is calculated. For example, as previously described, policy manager 123 may calculate a bandwidth based on expression (1).

Referring to FIG. 4B, it is determined whether a maximum bandwidth is exceeded (block 460). For example, policy manager 123 determines whether the calculated bandwidth exceeds a maximum bandwidth. If it is determined that the maximum bandwidth is exceeded (block 460—YES), then the on-demand request is blocked (block 465). For example, policy manager 123 generates and transmits an on-demand response to user device 140. The on-demand response denies the request and access to the requested program. Policy manager 123 may communicate the denial to other network devices (e.g., OLT 112, gateway router 128, etc.).

If it is determined that the maximum bandwidth is not exceeded (block 460-NO), then the on-demand request is accepted (block 470). For example, policy manager 123 may generate and transmit an on-demand response to another network device (e.g., OLT 112, gateway router 128). The on-demand response may indicate to service the on-demand request. If not already received by the other network device, the on-demand response may include the on-demand request.

Although FIGS. 4A and 4B illustrate an exemplary prioritized blocking process 400, according to other embodiments, process 400 may include additional operations, fewer operations, and/or different operations than those illustrated in FIGS. 4A and 4B described herein.

The foregoing description of embodiments provides illustration, but is not intended to be exhaustive or to limit the embodiments to the precise form disclosed. Accordingly, modifications to the embodiments described herein may be possible. Although the prioritized blocking of on-demand requests has been described in relation to type 1 and type 2 on-demand requests, this is merely illustrative. According to other embodiments, the prioritized blocking of on-demand requests may pertain to three or more types of on-demand requests. For example, if there are three types of on-demand requests, the prioritized blocking may accept or block type 3 on-demand requests. In this regard, types 1 and 2 on-demand requests have a higher priority than type 3 on-demand requests and arrivals of both type 1 and type 2 on-demand requests are predicted when a type 3 on-demand request is received. The type 3 on-demand request is accepted or blocked.

Additionally, while embodiments have been described that provides for the blocking of on-demand requests of a lower priority based on predictions of on-demand requests assigned a higher priority, according to another exemplary embodiment, policy manager 123 may invoke a stall process that protracts the determination of whether to block the on-demand request. For example, when the arrival of an on-demand request having the higher priority is predicted to occur within a small time window (which may be configured by an administrator, such as 1 minute or more) from the just-received on-demand request having the lower priority, policy manager 123 may stall making the determination to block the on-demand request. According to such an embodiment, if the predicted arrival does not occur within another small time window (which may be configured by the administrator, such as 1 minute or more) relative to the predicted arrival time, policy manager 123 may accept the on-demand request having the lower priority.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
   providing, by a network, at least one of a downloading service or a streaming service of programs, wherein the programs are provided to user devices;
   receiving, by a network device of the network, a request for a program from a user device;
   identifying, by the network device, a type of the request, wherein the type of the request pertains to a prioritized blocking service that affords a prioritized access to the at least one of the downloading service or the streaming service, on behalf of at least one type of request over at least one of another type of request;
   determining, by the network device, whether the prioritized blocking service is to be invoked based on the identifying;
   predicting, by the network device, a future arrival time and a future completion time of a request having a higher priority relative to the identified request, in response to determining that the prioritized blocking service is to be invoked and that the type of the identified request is of the at least one of the other type of request;
   calculating, by the network device, an available bandwidth based on the predicting; and
   blocking, by the network device, the identified request when the available bandwidth cannot support a session for the identified request and a session for the request having the higher priority.

2. The method of claim 1, wherein the predicting of the future arrival of the request falls within a time window of the session for the identified request if the identified request is accepted.

3. The method of claim 1, further comprising:
   calculating bandwidth utilization for active sessions over a time window corresponding a time window of the session for the identified request if the identified request is accepted; and calculating a difference between a maximum bandwidth allocated to the at least one of the downloading service or the streaming service and the calculated bandwidth utilization for the active sessions.

4. The method of claim 1, further comprising:
accepting the identified request when the available bandwidth can support the session for the identified request.

5. The method of claim 1, further comprising:
calculating future arrivals of requests and completions of sessions of the at least one type of request; and
storing prediction data based on the calculating future arrivals of requests and completions of sessions.

6. The method of claim 1, further comprising:
obtaining usage data that includes current session data and network resource utilization data, in response to determining that the prioritized blocking service is not to be invoked and that the type of the identified request is of the at least one type of request;
calculating an available bandwidth based on the usage data; and
determining whether to block or accept the identified request.

7. The method of claim 6, further comprising:
accepting the identified request in response to determining that a maximum bandwidth allocated to the at least one of the downloading service or the streaming service is not exceeded; and
providing the program to the user device in response to the accepting.

8. A network device comprising:
a communication interface;
a memory, wherein the memory stores instructions; and
a processor, wherein the processor executes the instructions to:
receive, via the communication interface, a request for a program from a user device;
identify a type of the request, wherein the type of the request pertains to a prioritized blocking service that affords a prioritized access to the at least one of the downloading service or the streaming service, on behalf of at least one type of request over at least one of another type of request;
determine whether the prioritized blocking service is to be invoked based on an identification of the type of request;
use prediction data that indicates a future arrival time and a future completion time of a request having a higher priority relative to the identified request, in response to a determination that the prioritized blocking service is to be invoked and that the type of the identified request is of the at least one of the other type of request;
calculate an available bandwidth based on the use of the prediction data; and
block the identified request when the available bandwidth cannot support a session for the identified request and a session for the request having the higher priority.

9. The device of claim 8, wherein the processor further executes the instructions to:
calculate bandwidth utilization for active sessions over a time window corresponding a time window of the session for the identified request if the identified request is accepted; and
calculate a difference between a maximum bandwidth allocated to the at least one of the downloading service or the streaming service and the calculated bandwidth utilization for the active sessions.

10. The device of claim 8, wherein the processor further executes the instructions to:
collect historical data pertaining to requests of the at least one type of request;
calculate future arrivals of requests and completions of sessions of the at least one type of request based on the historical data; and
store the prediction data based on a calculation of future arrivals of requests and completions of sessions.

11. The device of claim 8, wherein the processor further executes the instructions to:
obtain usage data that includes current session data and network resource utilization data, in response to a determination that the prioritized blocking service is not to be invoked and that the type of the identified request is of the at least one type of request;
calculate an available bandwidth based on the usage data; and
determine whether to block or accept the identified request.

12. The device of claim 8, wherein the processor further executes the instructions to:
accept the identified request when the available bandwidth can support the session for the identified request.

13. The device of claim 8, wherein, when using the prediction data, the processor further executes the instructions to:
use the prediction data that pertains to a time window of the session for the identified request if the identified request is accepted.

14. The device of claim 8, wherein, when blocking, the processor further executes the instructions to:
generate a response that indicates that a program service is not available; and
transmit, via the communication interface, the response to the user device.

15. The device of claim 8, wherein the processor further executes the instructions to:
determine whether an arrival time of the request is within a first time window of the future arrival time of the request having the higher priority;
stall in blocking the identified request in response to a determination that the arrival time of the request is within the first time window; and
wait to see if the future arrival time of the request having the higher priority occurs within a second time window.

16. A non-transitory storage medium storing instructions executable by a computational device to:
receive a request for a program from a user device;
identify a type of the request, wherein the type of the request pertains to a prioritized blocking service that affords a prioritized access to the at least one of the downloading service or the streaming service, on behalf of at least one type of request over at least one of another type of request;
determine whether the prioritized blocking service is to be invoked based on an identification of the type of request;
use prediction data that indicates a future arrival time and a future completion time of a request having a higher priority relative to the identified request, in response to a determination that the prioritized blocking service is to be invoked and that the type of the identified request is of the at least one of the other type of request;
calculate an available bandwidth based on the use of the prediction data; and block the identified request when the available bandwidth cannot support a session for the identified request and a session for the request having the higher priority.

17. The non-transitory storage medium of claim 16, further storing instructions executable by the computational device to:

calculate bandwidth utilization for active sessions over a time window corresponding a time window of the session for the identified request if the identified request is accepted; and calculate a difference between a maximum bandwidth allocated to the at least one of the downloading service or the streaming service and the calculated bandwidth utilization for the active sessions.

18. The non-transitory storage medium of claim 16, further storing instructions executable by the computational device to:

collect historical data pertaining to requests of the at least one type of request;

calculate future arrivals of requests and completions of sessions of the at least one type of request based on the historical data; and store the prediction data based on a calculation of future arrivals of requests and completions of sessions.

19. The non-transitory storage medium of claim 16, further storing instructions executable by the computational device to:

obtain usage data that includes current session data and network resource utilization data, in response to a determination that the prioritized blocking service is not to be invoked and that the type of the identified request is of the at least one type of request;

calculate an available bandwidth based on the usage data; and determine whether to block or accept the identified request.

20. The non-transitory storage medium of claim 16, further storing instructions executable by the computational device to:

use the prediction data that pertains to a time window of the session for the identified request if the identified request is accepted.

21. A method, comprising:

identifying an on-demand request as a high priority request or a low priority request;

if identified as said high priority request, immediately servicing said high priority request provided that sufficient total bandwidth is available to continue servicing previous requests being serviced at the time of arrival of said high priority request; and if identified as said low priority request, predicting if future high priority requests shall be made over the duration of said low priority request and, if so, allowing said low priority request if said sufficient total bandwidth is available to both continue servicing previous requests being serviced at the time of arrival of said low priority request and service all said future high priority requests and, if not, disallowing said low priority request.

* * * * *